United States Patent Office 3,277,148
Patented Oct. 4, 1966

3,277,148
DIALKYL α-(DIALKYLHYDROXYPHENYL)-β-ALKYLTHIOBUTANDIOATES
David H. Steinberg, Bronx, N.Y., assignor to Geigy Chemical Corporation, Greenburgh, N.Y., a corporation of Delaware
No Drawing. Filed Jan. 11, 1965, Ser. No. 424,852
3 Claims. (Cl. 260—470)

This is a continuation-in-part of Serial No. 276,192, filed April 29, 1963, now abandoned.

The invention relates to esters which are useful in the stabilization of organic material normally subject to oxidative deterioration and in particular to esters containing dialkylhydroxyphenyl groups.

The compounds of the present invention may be represented by the formula:

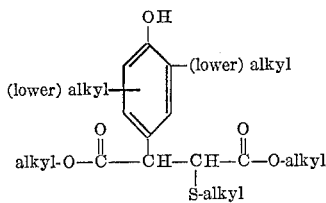

In the above formula and throughout this specification, the term "alkyl" is intended to embrace branched or straight chained saturated hydrocarbon groups having from 1 to 24 carbon atoms. When qualified by the term "(lower)," the alkyl group will contain no more than eight carbon atoms.

The compounds of the present invention are utilized in an amount from about 0.005 to about 10%, by weight of the total stabilized composition to provide protection against oxidative deterioration as well as that caused by light and heat. They may be used alone or in combination with other additives such as dilauryl thiodipropionate, ultraviolet light absorbers, other antioxidants, dyes, pigments, chelating agents and the like.

Materials which are stabilized according to the present invention include synthetic organic polymeric substances, both homopolymeric and copolymeric, such as vinyl resins formed from the polymerization of vinyl halides or from the copolymerization of vinyl halides with unsaturated polymerizable compounds, e.g., vinyl esters, α,β-unsaturated acids, α,β-unsaturated esters, α,β-unsaturated ketones, α,β-unsaturated aldehydes and unsaturated hydrocarbons such as butadienes and styrene; poly-α-olefins such as polyethylene, polypropylene, polybutylene, polyisoprene and the like, including copolymers of poly-α-olefins; polyurethanes such as are prepared from polyols and organic polyisocyanates; polyamides such as polyhexamethylene adipamide; polyesters such as polymethylene terephthalates; polycarbonates; polyacetals; polystyrene; polyethyleneoxide; and copolymers such as those of high impact polystyrene containing copolymers of butadiene and styrene and those formed by the copolymerization of acrylonitrile, butadiene and/or styrene. Other materials stabilized according to the present invention include lubricating oil of the aliphatic ester type, e.g., di-(2-ethylhexyl)azelate, pentaerythitol tetracaproate and the like; animal and vegetable derived oils, e.g., linseed oil, fat, tallow, lard, peanut oil, cod liver oil, castor oil, palm oil, corn oil, cotton seed oil and the like; hydrocarbon material such as gasoline, both natural and synthetic, diesel oil, mineral oil, fuel oil, cutting fluids, waxes, resins and the like; fatty acids; varnishes, soaps; and the like.

The compounds of the present invention may be prepared by treating a dialkyl 2-(dialkyl-4-hydroxyphenyl)-2-butendioate with an alkyl mercaptan. The required dialkyl butendioate may be prepared according to the procedures in copending application Serial No. 413,996 filed November 25, 1964, such as treating an actylenedicarboxylate with a dialkylphenol in the presence of a base such as potassium butoxide. Suitable phenols include 2,6-di-t-butylphenol, 2,5-di-t-butylphenol, 2,6-dimethylphenol, 2-methyl-6-t-butylphenol and the like.

The following examples will serve to further typify the nature of this invention but should not be construed as a limitation thereof. In these examples parts are by weight unless otherwise specified and temperature is expressed in degrees centigrade. The relation of parts by weight to parts by volume is as that of grams to cubic centimeters.

Example 1

To a stirred solution under nitrogen of 6.78 parts potassium t-butoxide in 125 parts by volume of dry t-butanol is added 37.1 parts of molten 2,6-di-t-butylphenol. To the resulting green mixture is added a solution of 10.65 parts dimethyl acetylenedicarboxylate in 30 parts by volume of dry t-butanol over a 30 minute interval with continuous stirring.

The resulting mixture is stirred and heated at 55-60° for 20.5 hours, then cooled and acidified with dilute hydrochloric acid and treated with ether and water. After the phases are separated, the aqueous phase is extracted with two fresh portions of ether. The original ether solution and ethereal extracts are combined, washed with water, aqueous sodium chloride and dried over sodium sulfate. After removal of the drying agent, the solvent is evaporated to yield dimethyl 2-(3,5-di-t-butyl-4-hydroxyphenyl)-2-butendioate, B.P. 184°/0.8 mm. Crystallization from cyclohexane yields the product as a solid, M.P. 142-143°.

Example 2

In a similar fashion, diethyl acetylenedicarboxylate and dipropyl acetylenedicarboxylate are substituted for dimethyl acetylenedicarboxylate in the procedure of Example 1 to yield diethyl 2-(3,5-di-t-butyl-4-hydroxyphenyl)-2-butendioate and dipropyl 2-(3,4-di-t-butyl-4-hydroxyphenyl)-2-butendioate, respectively.

Likewise by substituting 2,5-di-t-butylphenol and 2,6-dimethylphenol for 2,6-di-t-butylphenol in the procedure of Example 1 there are respectively formed dimethyl 2-(2,5-di-t-butyl-4-hydroxyphenyl)-2-butendioate and dimethyl 2-(3,5-dimethyl-4-hydroxyphenyl)-2-butendioate.

Example 3

To a solution of 7.18 parts of n-octadecylmercaptan and 1.35 parts of sodium methoxide in 60 parts by volume of methanol is added with stirring a solution of 8.71 parts of dimethyl 2-(3,5-di-t-butyl-4-hydroxyphenyl)-2-butendioate in 50 parts by volume of methanol. The mixture is stirred for fifteen hours at room temperature, taken up in benzene and ether, neutralized with glacial acetic acid, washed with water and saturated sodium chloride solution, and dried over sodium sulfate. After removing the drying agent, the solution is evaporated to yield dimethyl α-(3,5-di-t-butyl-4-hydroxyphenyl)-β-octadecylthiobutandioate, M.P. 86-88° C.

Similarly by use of other mercaptans such as dodecylmercaptan, hexylmercaptan, octylmercaptan and the like, the corresponding β-alkylthiobutandioates are obtained. Likewise other butendioates, such as dipropyl 2-(3,5-di-t-butyl-4-hydroxyphenyl)-2-butendioate may be substituted for 2-(3,5-di-t-butyl-4-hydroxyphenyl)-2-butendioate in the above to yield the corresponding dialkyl α-(dialkylhydroxpyhenyl)-β-alkylthiobutandioates.

What is claimed is:
1. Compounds of the formula:

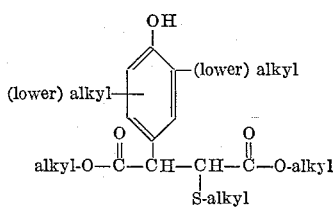

2. Compounds of the formula:

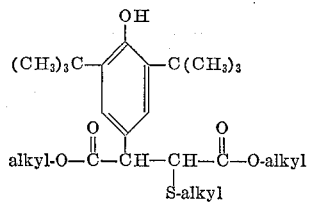

3. Dimethyl α - (3,5 - di - t-butyl-4-hydroxyphenyl)-β-octadecylthiobutandioate.

References Cited by the Examiner
UNITED STATES PATENTS
2,199,799   5/1940   Jacobson _____ 260—470 X LORRAINE A. WEINBERGER, *Primary Examiner.*

R. K. JACKSON, *Assistant Examiner.*